US010227515B2

(12) United States Patent
Humfeld et al.

(10) Patent No.: US 10,227,515 B2
(45) Date of Patent: Mar. 12, 2019

(54) ENCAPSULATED CATALYST FOR AEROSPACE GRADE RESIN SYSTEMS

(71) Applicant: THE BOEING COMPANY, Chicago, IL (US)

(72) Inventors: Keith Daniel Humfeld, Federal Way, WA (US); Gwen M. Gross, Redmond, WA (US)

(73) Assignee: THE BOEING COMPANY, Chicago, IL (US)

(*) Notice: Subject to any disclaimer, the term of this patent is extended or adjusted under 35 U.S.C. 154(b) by 41 days.

(21) Appl. No.: 15/653,989

(22) Filed: Jul. 19, 2017

(65) Prior Publication Data

US 2017/0313919 A1 Nov. 2, 2017

Related U.S. Application Data

(62) Division of application No. 14/814,989, filed on Jul. 31, 2015, now Pat. No. 9,758,706.

(51) Int. Cl.
| | | |
|---|---|---|
| *C09J 163/00* | (2006.01) | |
| *C08G 59/18* | (2006.01) | |
| *C08F 4/00* | (2006.01) | |
| *C09J 4/00* | (2006.01) | |
| *C09J 5/00* | (2006.01) | |

(52) U.S. Cl.
CPC .............. *C09J 163/00* (2013.01); *C08F 4/00* (2013.01); *C08G 59/188* (2013.01); *C09J 4/00* (2013.01); *C09J 5/00* (2013.01); *C09J 2433/00* (2013.01); *C09J 2463/00* (2013.01)

(58) Field of Classification Search
CPC ........................................................ C09J 163/00
See application file for complete search history.

(56) References Cited

U.S. PATENT DOCUMENTS

| | | | |
|---|---|---|---|
| 3,395,105 A | | 7/1968 | Washburn et al. |
| 3,666,597 A | * | 5/1972 | Willis .................. B27D 1/04 |
| | | | 156/155 |
| 4,155,950 A | | 5/1979 | Wolinski et al. |
| 5,677,398 A | | 10/1997 | Motoshima et al. |
| 6,117,551 A | | 9/2000 | Nagata et al. |
| 2004/0074089 A1 | | 4/2004 | Gilleo |
| 2012/0164455 A1 | | 6/2012 | Griffin et al. |

FOREIGN PATENT DOCUMENTS

| | | |
|---|---|---|
| EP | 1411102 A1 | 4/2004 |
| EP | 3072937 A1 | 9/2016 |
| WO | 2013093065 A1 | 6/2013 |
| WO | 2014049602 A1 | 4/2014 |

OTHER PUBLICATIONS

Extended European Search Report dated Dec. 6, 2016 for Application No. EP 16180571.8.

* cited by examiner

*Primary Examiner* — Daniel H Lee
(74) *Attorney, Agent, or Firm* — Coats & Bennett, PLLC

(57) ABSTRACT

Methods and compositions, and components comprising the compositions, are disclosed relating to improved resin-based adhesives comprising encapsulating at least a catalyst compound. Further methods and compositions are disclosed relating to encapsulated catalysts in uncured resin-based adhesives, said encapsulated catalysts configured to release the catalyst compound and cure the uncured resin-based adhesive on-demand.

20 Claims, 2 Drawing Sheets

ENCAPSULATED CATALYST FOR AEROSPACE GRADE RESIN SYSTEMS

This application is a divisional application of allowed U.S. patent application Ser. No. 14/814,989, filed 31 Jul. 2015, the disclosures of which are incorporated herein by reference in their entirety.

TECHNOLOGICAL FIELD

The present disclosure generally relates to the field of adhesives. More particularly, the present disclosure relates to the field of resin-based compounds comprising encapsulated catalysts that can be released on-demand to cure an adhesive.

BACKGROUND

Aerospace-grade composite resins typically consist of a blend of epoxy monomers including, without limitation, multifunctional epoxy monomer(s) and a bi-functional amine monomer(s). To achieve a reasonable rate of reaction at an elevated temperature, resin systems frequently incorporate catalyst molecules that will accelerate the epoxy-amine reaction to a desirable cure. It is desirable to maintain room temperature tack of an adhesive for the longest possible duration, while still providing a fast rate of reaction at elevated temperatures. This can be accomplished by segregating most of the catalyst from the resin at room temperature, but it must be accomplished in a way that causes a catalyst to be dispersed throughout the resin at an elevated temperature.

Traditional epoxy resins, and other adhesive resin curing systems are typically governed by understood curing kinetics. In the case of epoxy resins, the curing of epoxy resin systems is often governed by the curing kinetics of epoxy resins with multifunctional amines or thiol reactive groups that are often combined with a catalyst. Such adhesive systems have limited manufacturing flexibility due to the relationship between work life of the adhesive and cure time. Work life is understood to be the amount of time available to make an active epoxy resin-based adhesive, followed by applying an epoxy-based adhesive to the desired end use before the epoxy resin-based adhesive "sets" or "cures" to the point where it becomes unworkable to apply (because the epoxy has hardened and will no longer "flow"). Therefore, highly accelerated epoxy resin adhesive system cure times inevitably lead to shorter, and often impractical, pot life times. Conversely, an epoxy resin system having a longer work life takes a longer time to cure. Longer adhesive system cure times increase manufacturing time on a production line, and otherwise lead to increased production inefficiency.

In addition, known epoxy resin- and acrylate resin-based adhesive systems may require heat to activate a system catalyst and "trigger" the curing reaction. In many manufacturing systems for large components, including, without limitation, those components typically manufactured in connection with the aerospace industry, presenting equipment capable of supplying evenly applied heat to such components of a certain dimension to trigger adhesive curing is not possible, not practical, or would significantly increase manufacturing cost.

An efficient and cost-effective on-demand adhesive system that is both rapid curing, and that also has a significantly long work life would be useful, cost-effective and highly advantageous.

BRIEF SUMMARY

The present disclosure relates methods and compositions for controlling curing of epoxy resin- and acrylate resin-based adhesives through the use of encapsulated initiators that can be selectively triggered through the application of predetermined temperature and/or pressure. For purposes of the present specification, it is understood that the terms "initiators", "accelerators" and "catalysts" are used interchangeably, and are therefore equivalent terms.

According to one aspect of the disclosure, methods are disclosed for making an adhesive compound comprising mixing a resin-based compound with an encapsulated catalyst to form an uncured resin-based adhesive, with the encapsulated catalyst encapsulated within a shell, exposing the encapsulated catalyst to a predetermined temperature, exposing the encapsulated catalyst to a predetermined pressure, and curing the uncured resin-based adhesive.

According to a further aspect of the disclosure, methods are disclosed for adhering structures comprising applying an uncured resin-based adhesive compound to a surface of a first structure, with the uncured resin-based adhesive compound comprising an encapsulated catalyst, with the encapsulated catalyst encapsulated within a shell; contacting a surface of a second structure to an amount of the uncured resin-based adhesive compound present on the surface of the first structure; exposing the encapsulated catalyst to a predetermined temperature; exposing the encapsulated catalyst to a predetermined pressure; and curing the resin-based adhesive compound.

In a further aspect, the encapsulated catalyst is exposed to a predetermined temperature ranging from about 70° F. to about 110° F.

In another aspect, encapsulated catalyst is exposed to a predetermined pressure ranging from about 30 psi to about 100 psi, In a further aspect, the shell comprises a shell diameter ranging from about 0.05 microns to about 0.5 microns.

In yet another aspect, the shell releases the encapsulated catalyst when the shell material is exposed to a pressure ranging from about 30 psi to about 100 psi.

In another aspect, the shell releases the encapsulated catalyst when the shell material is exposed to a temperature ranging from about 100° F. to about 300° F.

In a further aspect, the shell releases the encapsulated catalyst when the shell is exposed to a temperature ranging from about 70° F. to about 110° F.

In another aspect, the shell releases the encapsulated catalyst when the shell is exposed to a pressure ranging from about 30 psi to about 100 psi.

In a still further aspect, a predetermined amount of inert gas is encapsulated with the catalyst within the shell.

In still another aspect, the encapsulated catalyst is in a solid state or in a liquid state at room temperature.

In yet another aspect, the shell has a melting point ranging from about 100° F. to about 300° F.

In yet another aspect, the shell comprises a shell diameter ranging from about 0.5 microns to about 2.0 microns.

In another aspect, the uncured resin-based adhesive compound comprises an epoxy resin-based compound.

In another aspect, the uncured resin-based adhesive compound comprises an epoxy resin-based compound comprising tris-(dimethylaminomethyl) phenol, nonyl phenol, benzyldimethylamine, triethanolamine boron trichloride methyl amine, boron trichloride ethylamine and homologues, boron trifluoride methyl amine, boron trifluoride ethylamine and homologues, boron trifluoride dimethylamine, boron trifluoride diethylamine and homologues, boron trifluoride trimethylamine, boron trifluoride triethylamine and homologues, boron trifluoride piperadine, boron trifluoride hexylamine, 4,4'methylene bis(phenyl dimethyl urea), 1,1'-(4 methyl-m-phenylene) bis(3,3 dimethyl urea), isophthalic dihydrazide, 2-methylimidazole, 2-ethyl-4-methylimidazole, 4,4'-diaminodiphenyl sulfone, dicyandiamide-containing compounds, imidazole-containing compounds, etc. or combinations thereof.

In yet another aspect, the uncured resin-based adhesive compound comprises diglycidyl ethers of bisphenol A; dicgycidyl ethers of bisphenol F; N,N,N',N'-tetraglycidyl-4,4'-diaminophenylmethane; p-amino phenol triglycidyl ether; epoxy phenol novolac resins; epoxy cresol novolac resins; 1,3,5-triglycidyl isocyanurate; tris(2,3-epoxypropyl)isocyanurate (and isocyanurates); glycerol diglycidyl ether; trimethylolpropane triglycidyl ether, etc. or combinations thereof.

In a further aspect, the encapsulated catalyst comprises at least one amine.

In a further aspect, the encapsulated catalyst comprises aliphatic primary amines, aliphatic secondary amines, aromatic amines, or combinations thereof.

In yet another aspect, the encapsulated catalyst is in a liquid state, with the catalyst comprising a compound including tris-(dimethylaminomethyl) phenol, nonyl phenol, benzyldimethylamine (BDNA), triethanolamine, or combinations thereof.

In a further aspect, the uncured resin-based adhesive compound comprises an acrylate resin-based compound.

In yet another aspect, the acrylate resin-based compound comprises monoacrylates, diacrylates, triacrylates, tetraacrylates, pentaacrylates or combinations thereof.

A still further aspect is directed to an uncured adhesive material, said uncured adhesive material comprising, in a mixture, a resin-based compound and an encapsulated catalyst, with the catalyst encapsulated within a shell, and with the encapsulated catalyst releasable from the shell at a predetermined temperature and a predetermined pressure.

In another aspect, the uncured adhesive material is curable on-demand.

A still further aspect is directed to a component comprising an uncured adhesive material comprising, in a mixture, a resin-based compound and an encapsulated catalyst, with the catalyst encapsulated within a shell, and with the encapsulated catalyst releasable from the shell at a predetermined temperature and a predetermined pressure.

A further aspect contemplates components and parts designed to be positioned on a structure, including an exterior structure or interior structure, of atmospheric and aerospace vehicles and other objects, and structures designed for use in space or other upper-atmosphere environments, such as, for example manned or unmanned vehicles and objects. Further contemplated objects include, but are not limited to, objects such as, for example, vehicles including, without limitation, aircraft, spacecraft, satellites, rockets, missiles, etc. and therefore include, without limitation, manned and unmanned aircraft, spacecraft, terrestrial, non-terrestrial, and surface and sub-surface water-borne vehicles and objects, etc. Further contemplated objects include stationary structures that may or may not comprise moving components such as, for example, buildings, generators, wind turbines, etc.

A still further aspect discloses an aircraft having components comprising an uncured adhesive material that itself comprises, in a mixture, a resin-based compound and an encapsulated catalyst, with the catalyst encapsulated within a shell, and with the encapsulated catalyst releasable from the shell at a predetermined temperature and/or a predetermined pressure.

A further aspect discloses a composite material comprising an uncured adhesive material comprising, in a mixture, a resin-based compound and an encapsulated catalyst, with the catalyst encapsulated within a shell, and with the encapsulated catalyst releasable from the shell at a predetermined temperature and/or a predetermined pressure, with the composite material comprising fibers including carbon fibers, glass fibers, metal fibers, and combinations thereof, along with fibers that can be woven into a polymer mat or woven scrim, etc.

Still further aspects disclose a component comprising a composite material, with the composite material comprising an uncured adhesive The uncured adhesive comprises, in a mixture, a resin-based compound and an encapsulated catalyst, with the catalyst encapsulated within a shell, and with the encapsulated catalyst releasable from the shell at a predetermined temperature and/or a predetermined pressure, with the composite material comprising fibers including carbon fibers, glass fibers, metal fibers, and combinations thereof. A further aspect discloses an aircraft, or other vehicle comprising the component set forth immediately above.

BRIEF DESCRIPTION OF THE DRAWINGS

Figure 1:
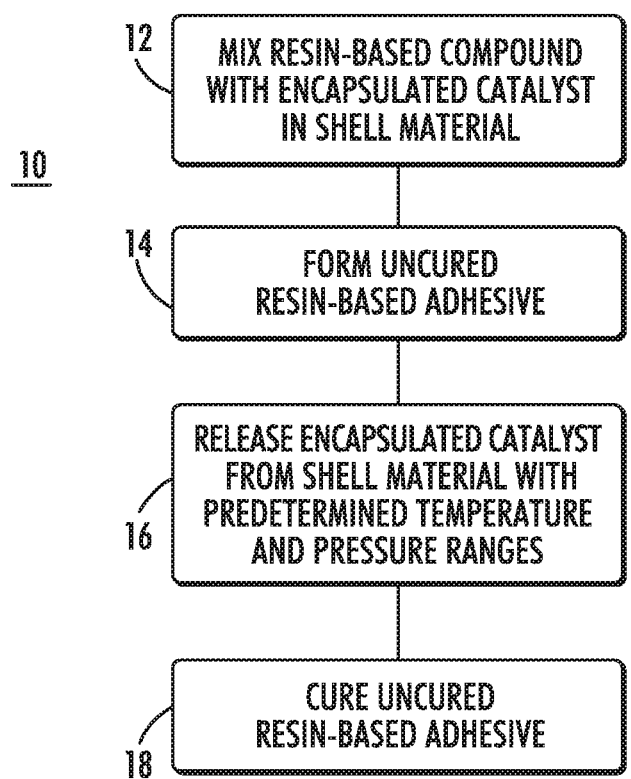

Having thus described variations of the disclosure in general terms, reference will now be made to the accompanying drawings, which are not necessarily drawn to scale, and wherein:

FIG. 1 is a flowchart for one aspect of the present disclosure; and

Figure 2:
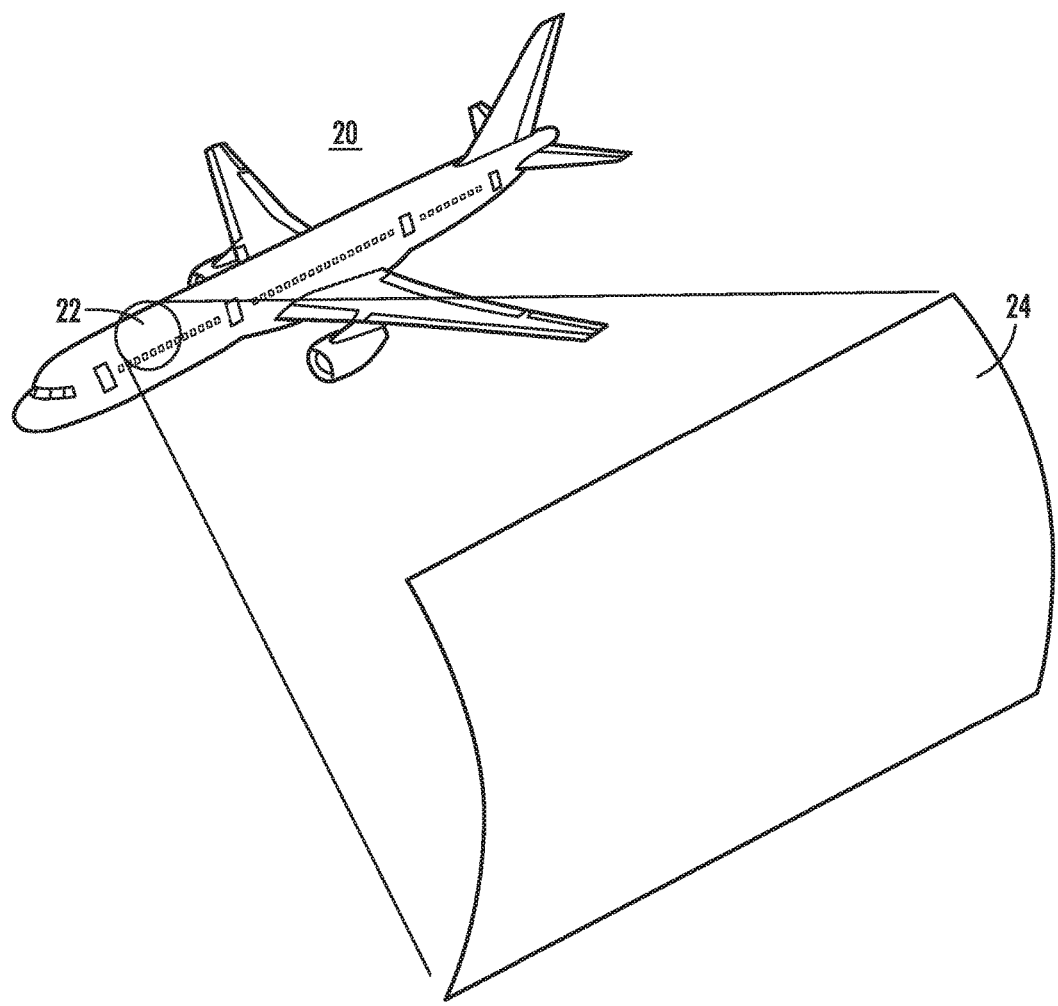

FIG. 2 is drawing of an aircraft comprising component parts comprising the adhesive according to aspects of the present disclosure

DETAILED DESCRIPTION

Aspects of the present disclosure are directed to methods and compositions for controlling the curing of uncured resin-based adhesive materials through the use of encapsulated initiators whose release may be accomplished when desired, and on-demand, by applying predetermined temperature and/or pressure to the uncured adhesive. It is contemplated that the uncured adhesive is applied to a material, including without limitation, a composite material, or a component comprising the composite material, and that the composite material is exposed to the predetermined temperature and/or pressure to cure the uncured adhesive material.

Aspects of the present disclosure combine the use of specially tailored resins and catalysts to accelerate cure time, with the tailored resins and catalysts triggered on-demand via exposing encapsulated catalysts to predetermined temperature and/or pressure combinations, while also achieving a user-controlled work life duration.

FIG. 1 is a flow chart showing one aspect of the present disclosure. According to FIG. 1, a method for making a resin-based adhesive 10 comprises first mixing a resin-based compound with an encapsulated catalyst, with the catalyst encapsulated within a shell material 12, forming an uncured resin-based adhesive 14. Upon exposing the uncured adhesive with predetermined temperatures and/or pressures, the encapsulated catalyst is released from the shell material 16. The release of the catalyst material into the resin-based compound then cures the uncured resin-based adhesive 18. It is understood that the resin-based compound may be an epoxy resin compound mixed with an amine compound. Other curatives present in place of, or in addition to the amine compound may also include anhydrides, acids, isocyanates, depending upon the chemistry of the resin-based component.

Composite components comprising resin-based adhesive are typically stored in refrigerated facilities or refrigerated areas of facilities that are maintained below room temperature to ensure that the resin-based adhesive remains in an uncured state. The allocation of space and resources to accomplish this is costly.

According to one aspect of the present disclosure, a resin-based adhesive system has been developed that will allow composite components comprising uncured resin-based adhesives to be maintained at room temperature.

Such composite components comprising the presently disclosed uncured resin-based adhesives can therefore be maintained at room temperature without risking premature curing of the resin-based adhesive (rendering the component part useless) through the premature release of catalyst within the resin-based adhesive system.

According to aspects of the present disclosure, components, such as, for example, composite-based components comprising a resin-based adhesive, are able to desirably retain predetermined levels of tack, even at room temperature. This ability to retain tack is important in light of the significant layup time required to assemble very large structural and other components and parts. Aspects of the present invention, therefore, allow longer assembly times as well as reducing significant component part waste that occurs when assembly time of composite materials into a component (the composite materials comprising uncured adhesive-based systems) exceeds the capacity of the uncured adhesive system to remain in an uncured state. The methods of making resin-based adhesives and adhesives of the present disclosure significantly increase flexibility of manufacturing schedules by increasing the time available to manufacture large composite parts and allow for the manufacture of significantly large parts within a given time frame, while significantly reducing the complexity and cost of manufacturing large composite parts by eliminating the need for storing an inventory of components, especially composite components below room temperature. In addition, aspects of the present disclosure allow for the faster production of composite parts comprising known resin-based adhesives. Still further, differing catalyst systems, perhaps even those yet unknown, will benefit from the encapsulated catalyst segregation disclosed herein, enabling a wider variety of catalysts and enabling the use of a wider variety of resin-based adhesive systems. In this way, various resin-based compounds may be modified for application in newer curing technologies with minimal or substantially no significant impact on the final performance characteristics of finished composite systems and products.

Further, in the manufacture of some composite materials, known adhesives typically use catalysts to cause the adhesives to gel and form prior to the surrounding uncured prepreg system achieving its minimum viscosity. This shortens the available shelf life of many adhesives and surfacing ply materials relative to the composite systems with which they are used. Encapsulating the catalyst according to aspects of this disclosure extends the shelf life of such materials, helping to reduce the scrap rate (i.e. waste) and costs associated with resulting waste.

Aspects of the present disclosure are directed to resin-based adhesives and adhesive systems that can be maintained substantially indefinitely in situ and integrally within composite parts in an uncured state, and at any desired temperature, including room temperature, as the catalysts are effectively segregated from the resin component until they are predictably released, for example, on-demand, as the composite comprising the adhesive is exposed to a preselected combination of preselected temperature and/or pressure.

According to one aspect of the disclosure, within a resin-based adhesive compound, an encapsulated catalyst is exposed to a predetermined temperature ranging from about 70° F. to about 300° F. and a predetermined pressure ranging from about 30 psi to about 100 psi, followed by curing the uncured resin-based adhesive.

In one aspect, a composite incorporating the uncured adhesive may be exposed to an elevated temperature (greater than ambient temperature), for example during composite layup operation, where the composite and the uncured adhesive are exposed to an elevated temperature ranging from about 110° F. to about 300° F. One aspect of the present disclosure contemplates exposing the composite and the uncured adhesive to both the elevated temperature and a pressure on the composite part ranging from about 90 psi to about 100 psi. According to this scheme, a faster cure of the uncured adhesive will be realized.

In a further aspect, a composite incorporating the uncured adhesive may be placed for processing and exposed to a temperature close to ambient temperature (about 70° F.). In this aspect, the composite part and the uncured adhesive may be exposed to a pressure of from about 30 psi to about 50 psi. At this pressure, the encapsulated catalyst in the uncured adhesive will be released as the shell containing the catalyst ruptures, beginning a slower cure of the uncured adhesive in concert with a rise in processing temperature of from about 70° F. to the desired final temperature required to process the composite during layup operations (a desired temperature of up to from about 110° F. to about 300° F.).

The catalyst shell can have any desired thickness but is understood to generally range from about 0.05 microns to about 0.5 microns, such that the shell will be designed to predictably rupture and release catalyst from the shell when the shell and the catalyst are exposed to a pressure ranging from about 30 psi to about 100 psi and/or a temperature ranging from about 70° F. to about 300° F.

In a further aspect, the shell releases the encapsulated catalyst when the shell is exposed to a temperature ranging from about 70° F. to about 110° F. In another aspect, the shell is released from the encapsulated catalyst when the shell and the catalyst are exposed to a pressure ranging from about 30 psi to about 100 psi.

According to a still further aspect, the uncured adhesive material is curable on-demand. That is, when the adhesive is desired to be cured, the adhesive, and/or the components comprising the uncured adhesives are exposed to predetermined conditions such as, for example, predetermined temperatures, pressure, or temperature/pressure combinations to achieve the desired curing of the adhesive and the desired cure rate.

An uncured adhesive material is understood to be a material that has not yet been cured, but one that, when exposed to conditions necessary to cure the compound, results in a cured adhesive material. Conditions required to cure an uncured adhesive material may include one or more of the following: time, temperature, pressure, exposure to preselected sonic frequency, exposure to a preselected radiation such as, for example, ultraviolet radiation, infrared radiation, etc. and combinations thereof.

When a preselected temperature and/or pressure is presented to the composite part comprising the uncured resin-based adhesive, the segregated catalyst is predictably released into the resin-based compound resulting in an adhesive cured in a predetermined fashion and at a predetermined curing rate. According to aspects of the present disclosure, this catalyst segregation is accomplished by encapsulating the catalyst alone, or in combination with an amine or other compound, that is a useful to achieve the desired properties of the resin-based adhesive.

The encapsulation is effected by manufacturing a capsule or shell having predetermined dimensions, and from materials designed to predictably rupture when exposed to predetermined temperature, predetermined pressure and/or predetermined temperature/pressure combinations. For the purposes of the present disclosure, the terms "shell" and "capsule" are used interchangeably, and are understood to be equivalent terms.

The encapsulated catalyst may be in a solid state or a liquid state at room temperature. Contemplated suitable liquid catalysts include, without limitation, tris-(dimethylaminomethyl) phenol, nonyl phenol, benzyldimethylamine (BDNA), triethanolamine, boron trichloride methyl amine, boron trichloride ethylamine and homologues, boron trifluoride methyl amine, boron trifluoride ethylamine and homologues, boron trifluoride dimethylamine, boron trifluoride diethylamine and homologues, boron trifluoride trimethylamine, boron trifluoride triethylamine and homologues, boron trifluoride piperadine, boron trifluoride hexylamine, 4,4'methylene bis(phenyl dimethyl urea), 1,1'-(4 methyl-m-phenylene) bis(3,3 dimethyl urea), isophthalic dihydrazide, 2-methylimidazole, 2-ethyl-4-methylimidazole, 4,4'-diaminodiphenyl sulfone, dicyandiamide-containing compounds, imidazole-containing compounds or combinations thereof.

Suitable contemplated epoxy resin-based compounds include, without limitation, digylcidyl ethers of bisphenol A; dicgycidyl ethers of bisphenol F; N,N,N',N'-tetragylcidyl-4, 4'-diaminophenylmethane; p-amino phenol triglycidyl ether; epoxy phenol novolac resins; epoxy cresol novolac resins; 1,3,5-triglycidyl isocyanurate; tris(2,3-epoxypropyl)isocyanurate (and isocyanurates); glycerol diglycidyl ether; trimethylolpropane triglycidyl ether, or combinations thereof.

Suitable acrylate resin-based compounds include, without limitation, the acrylate resin-based compounds comprising monoacrylates, diacrylates, triacrylates, tetraacrylates, pentaacrylates and combinations thereof, and include, without limitation, 3,3-diaminodiphenyl sulphone, 4,4-diaminodiphenyl sulphone, dicyandiamide, polyamidoamine, etc.

According to aspects of this disclosure, the encapsulated catalyst includes at least one amine, said amine including, without limitation, aliphatic primary amines, aliphatic secondary amines, aromatic amines, and combinations thereof, and include, without limitation, 3,3-diaminodiphenyl sulphone, 4,4-diaminodiphenyl sulphone, dicyandiamide, polyamidoamine, etc.

According to aspects of the present disclosure, the encapsulated solid or liquid catalysts may further comprise a predetermined volume of inert gas. Contemplated useful inert gases include without limitation argon, nitrogen, etc. The presence and amount of inert gas present within the shell containing the catalyst facilitates the desired and predetermined shell rupture and catalyst release from the shell at desired and predetermined conditions, such as, for example, predetermined temperatures and/or pressures.

Therefore, according to aspects of the present disclosure, the capsules are designed to be sufficiently brittle, yet also capable of not rupturing, and otherwise releasing contained catalyst, until a desired temperature and/or pressure is achieved, such as, for example a pressure ranging from about 30 psi to 100 psi. It is understood that a composite part comprising the resin-based adhesive would not ordinarily experience a pressure exceeding 30 psi until the composite part is ready for cure such as, for example, in an autoclave, and the layup procedure has therefore been completed. Therefore, the shell could be designed to rupture in a predetermined fashion when the shell is exposed to a predetermined pressure, for example, from about 30 psi to about 50 psi.

According to one aspect, given the small contemplated capsule size, ranging from a diameter of from about 0.05 to about 0.5 microns, and taking into consideration that the contained inert gas fills only a portion of the capsule, the amount of gas incorporated in the resin after capsule rupture, is very small. In addition, the released gas will be compressible at high pressure and will be substantially dissolved into the resin.

Alternatively, the present disclosure further contemplates designing capsules having shell walls designed to rupture and release catalyst contained therein at a predetermined combination of temperatures and/or pressures such as, for example, at temperatures ranging from about 70° F. to about 300° F. and pressures ranging from about 30 to about 100 psi. Using predetermined pressure and temperature combinations ensures that catalyst is not released until multiple processing condition thresholds are achieved.

Alternatively, it is further contemplated that a capsule may be designed from a material that does not shatter, but instead melts at a predetermined temperature, or temperature and/or pressure combinations. According to this aspect, the capsule may or may not comprise an amount of inert gas, as the inclusion of the inert gas is thought to assist a capsules' predictable rupture at a particular pressure or pressure/temperature combination. According to one aspect, such contemplated melting capsules have a melting point ranging from about 100° F. to about 300° F. According to another aspect, such contemplated melting capsules may have a shell diameter ranging from about 0.5 to about 2.0 microns.

In a further alternative, the present disclosure further contemplates the segregation of one part of a resin-based adhesive system from another through encapsulation. As presently contemplated, in a resin-based adhesive system comprising one or more epoxy and amine components, such amine components may be encapsulated alone, or may be encapsulated in capsules along with a catalyst. The capsules are then dispersed throughout the resin-based component, further enabling room temperature storage and transportation of uncured resin-based adhesives, and further eliminating the need for storage at specified temperatures such as, for example, below room temperature. Such a resin-based adhesive scheme would significantly reduce capital costs along the supply and manufacturing chain, and would liberate valuable facility space presently dedicated to component storage below room temperature. Such amine segregation from resin-based adhesive components would further allow the use of additional adhesive systems not presently possible due to inadequate work-life times, etc.

According to one aspect, during composite processing (with composite parts comprising the uncured resin-based adhesives of the present disclosure), the composite part is exposed to preselected temperatures and/or pressures, at which point the shell material of the capsules incorporating the catalyst in the uncured resin-based adhesives will break apart, thereby releasing the catalyst to the surrounding uncured resin-based adhesive, thus predictably initiating the cure of the adhesive.

According to further aspects, the shell material is selected such that it does not substantially disrupt the overall polymer structure, or otherwise interfere with the desired properties and characteristics of the cured adhesive, or interfere with the catalyzation rate or catalyst reaction. According to one aspect, the shell comprises a material already present in the resin-based adhesive system. Contemplated solid catalyst capsules include, without limitation, polyethersulphones, polysulphones, polyamides, nitrile rubbers, polyurethanes, polysiloxanes, carboxy-terminated butadiene acrylonitriles, etc. According to one aspect, the shell comprises materials having solvent-resistant properties, and other properties substantially similar to compounds present in the resin-based adhesive system. In addition, hollow silica (glass) capsules are common and may be used.

According to aspects of the disclosure, capsule or shell materials that do not rupture, but instead melt at desired and predetermined temperature and/or pressure combinations are also contemplated. In such systems, where the shell material is to melt, an amine or epoxy monomer may be preferable so that the shell material will not be a parasitic mass in the cured adhesive, and the shell material will mix into the uncured and cured resin. Examples of contemplated appropriate amine compounds (and their melting points) include, without limitation N-(3-aminopropyl) methacrylamide hydrochloride (260° F.) and 2-aminoethyl methacrylate hydrochloride (250° F.). Useful epoxy resins include, without limitation, epoxies based on bisphenol A and/or bisphenol F, with such epoxy compounds having molecular weights greater than about 1,000 g/mole, and melting temperatures greater than about 300° F. for a 350° F. cure system and greater than about 185° F. for a 250° F. cure system.

The mass of a spherical pressure vessel is $$M = \frac{3}{2} PV \frac{\rho}{\sigma},$$

where P is the pressure difference, V is the volume $$\left(V = \frac{4}{3}\pi r^3\right),$$

$\rho$ is the density of the material, and $\sigma$ is the failure stress. The mass of a spherical shell is also approximated by $M = 4\pi r^2 t \rho$, where t is the thickness and r is the radius. Rearranging the variables results in a designed shell thickness $$\text{of } t = \frac{Pr}{2\sigma}.$$

For a 200 nm radius silica sphere (assuming $\sigma$=102 MPa) capable of supporting 50 psi (0.345 MPa) pressure difference, 0.3 nm wall thickness is required.

If the shell is fabricated in a pressurized environment, that does not exceed half its intended failure pressure, it can comprise shell walls that are less thick, thus reducing the net parasitic weight in the final structure. For example, if the capsule is fabricated at 35 psi and is capable of supporting 45 psi difference between inside and outside, the capsule will not shatter at ambient pressure, and will shatter at 80 psi. Thus the shell can be designed to shatter at 80 psi while being made of enough material to support only 45 psi difference; a savings of 45% on capsule mass.

Methods of encapsulating catalyst species include those methods known to those skilled in the field of polymer-based encapsulation. Such encapsulation methods include layer-by-layer complex coacervation; double emulsion techniques; interfacial polymerization; silica-shell microencapsulation; nanoparticle embedded microencapsulation, etc.

Layer-by-layer complex coacervation involves the emulsification of catalyst droplets (typically tertiary amines) in an aqueous solution stabilized by a charged surfactant. An oppositely charged high molecular weight polyelectrolyte is then introduced into the aqueous phase to complex with the surfactant charge. Polyelectrolytes of alternating charge can then be added sequentially to increase capsule wall thickness and robustness.

In double emulsion techniques, an aqueous amine-loaded solution is introduced into organic solvent containing dissolved polymer with surfactant, and produces a water-in-oil emulsion, followed by slow addition of this solution into a larger aqueous mixture-containing surfactant. The organic phase is slowly evaporated with stirring to condense out the rigid polymer shell.

Interfacial polymerization involves a catalyst to be encapsulated being dispersed in a continuous phase with a component added to react with the catalyst at the interface. Formation of the capsule or shell wall is promoted by reacting functional groups that can be catalyzed or uncatalyzed. The thickness of the capsule layer (i.e. the shell wall) is limited by the diffusion of reactive species as the layer is polymerized.

Silica shell microencapsulation involves a hydrophobic catalyst being emulsified with surfactants containing hydroxyl groups in a continuous phase of basic water. Tetraethyl orthosilicate, or similar silyl ether capable of condensation reactions, is hydrolyzed and added drop-wise to a stirring solution of emulsified catalyst forming a silica shell around the emulsion.

Nanoparticle embedded microencapsulation is a technique involving the emulsification of catalyst droplets (typically tertiary amines) in an aqueous solution stabilized by a charged surfactant. An oppositely charged high molecular weight polyelectrolyte is then introduced into the aqueous phase to complex with the surfactant charge. Polyelectrolytes of alternating charge can then be added sequentially to increase capsule wall thickness and robustness. The nanoparticles can be substituted in for a polyelectrolyte layer, thus embedding the particles in the shell of the microparticle.

EXAMPLES FOR CATALYST ENCAPSULATION

Layer-By-Layer—Complex Coacervate
Oil in water emulsions were prepared by processing 98 g of NaOH (0.01 M) and 2 g of dimethyltetradecylamine (DMTDA) and 0.02 g of cetyltrimethylammonium bromide (CTAB) by two runs through a microfluidizer. The formed emulsion was stirred at high speed via stir bar for 45 minutes, while 200 mg of poly(styrene sulfonate) (PSS) in 50 mL of water was added drop-wise to the emulsion via syringe pump.

Double Emulsion Solvent Evaporation
Poly(caprolactone) shell material (1 g) was dissolved in 40 mL of dichloromethane. An internal water phrase was prepared by combining 1.5 g of NaOH (0.01 M) solution with 0.03 g sodium dodecylbenzenesulfonate (SDBS), and 1.5 g of triethylenetetramine. The internal water phase was added to the oil phase and the resulting mixture was agitated via a dispersion disk at 1900 rpm for 15 minutes. The first emulsion was then added to 250 mL of a 0.16 wt. % solution of SDBS in water, which was agitated by stir bar. The solution was maintained at 40-45° C. for approximately 6 hours until the dichloromethane had evaporated leaving hard poly(caprolactone) shells.

Interfacial Polymerization

An internal oil phase composed of 20 g dimethyl para-toluidine (DMPT), 15.94 g pentaerythritol tetrakis (3-mer-capto-propionate) (PTMP), and 11.85 g trimethylolpropane triacrylate (TMPTA) were mixed and suspended in 500 mL 1.28 wt. % poly (vinyl alcohol) in deionized water via dispersion disk at 2100 rpm for 30 minutes. The dispersion disk rate was then decreased to 1700 rpm, 0.9 mL octylamine was added, and agitation was allowed to continue for one hour.

Silica-Shell Microcapsule Preparation

In a beaker, Pluronic P123 (0.08 g) was dispersed in water containing NaOH (0.1 M NaOH, 50 mL). The solution was heated to 35° C. under constant stirring until Pluronic P123 was fully dissolved. Next, N,N-dimethyl tetradeclyamine (5 g, 20 millimole) was added to the solution and continuously stirred for 3 hours to form stable emulsions. In a separate beaker, tetraethyl orthosilicate (TEOS, 5 g 24 millimole) was added to an HCl aqueous solution (pH 2.45) and stirred at 35° C. until a homogenous solution was obtained. The contents from this beaker were then added to the emulsion solution drop-wise, and allowed to stir for 24 hours to complete microcapsule assembly. The white precipitate at the surface of the solution was collected, rinsed and allowed to dry. N,N-dimethyltetradecylamine having a lower density than water was expected to be at the surface after encapsulation.

The variations and alternatives of the present disclosure relate to the manufacture and use of components and parts such as, for example, composite component parts of any dimension, including the manufacture and use of components and parts in the fabrication of larger parts and structures. Such devices include, but are not limited to, components and parts designed to be positioned on the exterior or interior of stationary objects as well as objects including, without limitation, atmospheric and aerospace vehicles and other objects, and structures designed for use in space or other upper-atmosphere environments such as, for example, manned or unmanned vehicles and objects. Contemplated objects include, but are not limited to vehicles such as, for example, aircraft, spacecraft, satellites, rockets, missiles, etc. and therefore include manned and unmanned aircraft, spacecraft, terrestrial, non-terrestrial, and even surface and sub-surface water-borne vehicles and objects.

FIG. 2 is a drawing of an aircraft 20 with a section 22 enlarged and showing a fuselage panel 24 comprising composite components that, in turn, comprise resin-based adhesives of the present disclosure.

When introducing elements of the present disclosure or exemplary aspects or embodiment(s) thereof, the articles "a," "an," "the" and "said" are intended to mean that there are one or more of the elements. The terms "comprising," "including" and "having" are intended to be inclusive and mean that there may be additional elements other than the listed elements. Although this disclosure has been described with respect to specific embodiments, the details of these embodiments are not to be construed as limitations. While the preferred variations and alternatives of the present disclosure have been illustrated and described, it will be appreciated that various changes and substitutions can be made therein without departing from the spirit and scope of the disclosure.

What is claimed is:

1. A method for making an adhesive comprising the steps of:
   mixing a resin-based compound with an encapsulated catalyst to form an uncured resin-based adhesive, said encapsulated catalyst encapsulated within a shell, and said encapsulated catalyst comprising a predetermined volume of inert gas within the shell;
   exposing the encapsulated catalyst to a predetermined temperature;
   exposing the encapsulated catalyst to a predetermined pressure to rupture the shell;
   rupturing the shell;
   releasing the encapsulated catalyst and inert gas from the shell into the resin-based compound;
   incorporating an amount of inert gas into the resin-based compound; and
   curing the uncured resin-based adhesive.

2. The method of claim 1, wherein, in the step of exposing the encapsulated catalyst to a predetermined temperature, further comprising exposing the encapsulated catalyst to a temperature ranging from about 70° F. to about 300° F.

3. The method of claim 1, wherein, in the step of exposing the encapsulated catalyst to a predetermined temperature, further comprising exposing the encapsulated catalyst to a pressure ranging from about 30 psi to about 100 psi.

4. The method of claim 1, wherein, in the step of mixing a resin-based compound with an encapsulated catalyst, the shell comprises an average diameter ranging from about 0.05 microns to about 0.5 microns.

5. The method of claim 1, wherein, in the step of mixing a resin-based compound with an encapsulated catalyst the inert gas comprises: argon, nitrogen or combinations thereof.

6. The method of claim 1, wherein, in the step of mixing a resin-based compound with an encapsulated catalyst, the encapsulated catalyst is a compound comprising tris-(dimethylaminomethyl) phenol, nonyl phenol, benzyldimethyl-amine, triethanolamine, boron trichloride methyl amine, boron trichloride ethylamine and homologues, boron trifluoride methyl amine, boron trifluoride ethylamine and homologues, boron trifluoride dimethylamine, boron trifluoride diethylamine and homologues, boron trifluoride trimethylamine, boron trifluoride trimethylamine and homologues, boron trifluoride piperadine, boron trifluoride hexylamine, 4,4'methylene bis(phenyl dimethyl urea), 1,1'-(4 methyl-m-phenylene) bis(3,3 dimethyl urea), isophthalic dihydrazide, 2-methylimidazole, 2-ethyl-4-methylimidazole, 4,4'-diaminodiphenyl sulfone, dicyandi-amide-containing compounds, imidazole-containing compounds, or combinations thereof.

7. The method of claim 1, wherein, in the step of mixing a resin-based compound with an encapsulated catalyst, the resin-based compound comprises an epoxy resin-based compound comprising diglycidyl ethers of bisphenol A; digylcidyl ethers of bisphenol F; N,N,N',N'-tetragylcidyl-4,4'-diaminophenylmethane; p-amino phenol triglycidyl ether; epoxy phenol novolac resins; epoxy cresol novolac resins; 1,3,5-triglycidyl isocyanurate; tris(2,3-epoxypropyl)isocya-nurate (and isocyanurates); glycerol diglycidyl ether; trimethylolpropane triglycidyl ether, or combinations thereof.

8. The method of claim 1, wherein, in the step of mixing a resin-based compound with an encapsulated catalyst, the encapsulated catalyst comprises at least one amine.

9. An uncured adhesive material, said uncured adhesive material comprising in a mixture:
an uncured resin-based compound; and
an encapsulated catalyst, said encapsulated catalyst encapsulated within a shell; and
a predetermined volume of inert gas encapsulated within the shell, with said encapsulated catalyst and said inert gas releasable from the shell at a predetermined temperature and a predetermined pressure;
wherein said inert gas is incorporated into the resin-based compound after the inert gas is released from the shell; and
wherein the uncured adhesive material is curable on-demand.

10. The uncured adhesive material of claim 9, wherein the shell ruptures at a temperature ranging from about 70° F. to about 300° F.

11. The uncured adhesive material of claim 9, wherein the shell ruptures at a pressure ranging from about 30 psi to about 100 psi.

12. The uncured adhesive material of claim 9, wherein the shell comprises an average diameter ranging from about 0.05 microns to about 0.5 microns.

13. The uncured adhesive material of claim 9, wherein the inert gas comprises argon, nitrogen, or combinations thereof.

14. The uncured adhesive material of claim 9, wherein the encapsulated catalyst comprises: tris-(dimethylaminomethyl) phenol, nonyl phenol, benzyldimethylamine, triethanolamine, boron trichloride methyl amine, boron trichloride ethylamine and homologues, boron trifluoride methyl amine, boron trifluoride ethylamine and homologues, boron trifluoride dimethylamine, boron trifluoride diethylamine and homologues, boron trifluoride trimethylamine, boron trifluoride trimethylamine and homologues, boron trifluoride piperadine, boron trifluoride hexylamine, 4,4'methylene bis(phenyl dimethyl urea), 1,1'-(4 methyl-m-phenylene) bis (3,3 dimethyl urea), isophthalic dihydrazide, 2-methylimidazole, 2-ethyl-4-methylimidazole, 4,4'-diaminodiphenyl sulfone, dicyandiamide-containing compounds, imidazole-containing compounds, or combinations thereof.

15. The uncured adhesive material of claim 9, wherein the encapsulated catalyst comprises at least one amine.

16. The uncured adhesive material of claim 9, wherein the resin-based compound comprises an epoxy resin-based compound.

17. The uncured adhesive of claim 16, wherein the epoxy resin-based compound comprises: diglycidyl ethers of bisphenol A; diglycidyl ethers of bisphenol F; N,N,N',N'-tetraglycidy-4,4'-diaminophenylmethane; p-amino phenol triglycidyl ether; epoxy phenol novolac resins; epoxy cresol novolac resins; 1,3,5-triglycidyl isocyanurate; tris(2,3-epoxypropyl)isocyanurate (and isocyanurates); glycerol diglycidyl ether; trimethylolpropane triglycidyl ether, or combinations thereof.

18. A component comprising the uncured adhesive of claim 9.

19. A vehicle comprising the component of claim 18.

20. The vehicle of claim 19, wherein the vehicle comprises: manned and unmanned aircraft, manned and unmanned spacecraft, manned and unmanned water-borne vehicles and manned and unmanned sub-surface water-borne vehicles.

* * * * *

UNITED STATES PATENT AND TRADEMARK OFFICE
CERTIFICATE OF CORRECTION

PATENT NO. : 10,227,515 B2
APPLICATION NO. : 15/653989
DATED : March 12, 2019
INVENTOR(S) : Keith Daniel Humfeld and Gwen M. Gross Page 1 of 1

It is certified that error appears in the above-identified patent and that said Letters Patent is hereby corrected as shown below:

In the Claims

In Column 12, Line 62, in Claim 7, delete "digylcidyl ethers of bisphenol F; N,N,N',N'-tetragylcidyl-4," and insert --diglycidyl ethers of bisphenol F; N,N,N',N'-tetraglycidyl-4,--, therefor.

Signed and Sealed this
Thirty-first Day of December, 2019

Andrei Iancu
*Director of the United States Patent and Trademark Office*